United States Patent [19]
Gibbs et al.

[11] 3,843,582
[45] Oct. 22, 1974

[54] REDUCING HEAT-SEAL TEMPERATURE REQUIREMENTS FOR COATINGS PREPARED FROM LATEXES OF VINYLIDENE CHLORIDE POLYMERS

[75] Inventors: Dale S. Gibbs; Ritchie A. Wessling, both of Midland, Mich.

[73] Assignee: The Dow Chemical Company, Midland, Mich.

[22] Filed: July 9, 1973

[21] Appl. No.: 377,481

Related U.S. Application Data

[63] Continuation-in-part of Ser. No. 202,624, Nov. 26, 1971, abandoned.

[52] U.S. Cl. .............. 260/29.6 TA, 260/29.6 E, 260/29.6 ME, 260/29.6 MQ, 260/29.6 RB, 260/29.6 RW, 260/29.6 SQ, 260/29.6 Z
[51] Int. Cl. ............................................. C08f 1/13
[58] Field of Search ................ 260/29.6 TA, 79.3 M

[56] References Cited
UNITED STATES PATENTS

| | | | |
|---|---|---|---|
| 3,324,064 | 6/1967 | Fikenscher et al. | 260/29.6 TA |
| 3,483,154 | 12/1969 | Gibbs | 260/29.6 TA |
| 3,617,368 | 11/1971 | Gibbs | 260/29.6 TA X |
| 3,701,745 | 10/1972 | Settlage et al. | 260/29.6 TA X |

Primary Examiner—Lucille M. Phynes
Attorney, Agent, or Firm—Ronald G. Brookens

[57] ABSTRACT

A process for reducing the heat-seal temperature requirements of films and coatings produced from high vinylidene chloride polymer latexes comprising having present in films or coatings formed from such latexes, prior to fusion thereof, from about 0.5 to about 5 percent by weight of latex polymer solids of an adduct of an aliphatic alcohol or aliphatic acid and ethylene oxide, such adduct having the formula

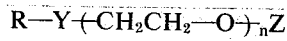

where R is alkyl having from four to about 18 carbon atoms, Y is

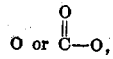

$n$ is an integer of from 4 to 25 and Z is hydrogen.

5 Claims, No Drawings

REDUCING HEAT-SEAL TEMPERATURE REQUIREMENTS FOR COATINGS PREPARED FROM LATEXES OF VINYLIDENE CHLORIDE POLYMERS

BACKGROUND

This application is a continuation-in-part of the now abandoned application Ser. No. 202,624, filed Nov. 26, 1971.

Copolymers and interpolymers of vinylidene chloride with such comonomers as acrylonitrile, vinyl chloride, and lower alkyl acrylates have found wide acceptance as film and coating materials because of their desirable properties including transparency, inertness, ability to be heat sealed and impermeability to moisture and gases. It is also recognized that the impermeability of such film and coatings increases with an increasing concentration of vinylidene chloride in the polymer latex. It is further recognized that such increase in impermeability is accompanied by a higher temperature requirement for producing an effective heat seal in the resulting film or coating, e.g., film and coatings prepared from a polymer containing at least about 80 percent by weight vinylidene chloride in the polymer molecule requires a temperature of at least about 160° C. for effective heat sealing. This high temperature requirement is particularly undesirable where high speed commercial packaging techniques are employed.

It is the primary object of this invention to provide a means of significantly lowering the heat-seal temperature requirement for films and coatings prepared from polymers containing at least about 80 percent by weight of vinylidene chloride in the polymer molecule, without adversely affecting the impermeability and other desired properties of such film or coatings.

SUMMARY

The above and related objects are attained by a process comprising the production of a polymer latex which consists essentially of water and a colloidally dispersed solid polymer prepared by the polymerization in aqueous dispersion of 1. at least about 80 percent by weight based on the total weight of monomers used of vinylidene chloride, 2. from about 0.1 to about 5 percent based on the total weight of the monomers used of a significantly water-soluble ionic material selected from the group of sulfonic acids and their salts having the formula $$R-Z-Q-SO_3^--M+$$

wherein the radical R is selected from the group consisting of vinyl and alpha-substituted vinyl; the symbol Z represents a difunctional linking group which will activate the double bond present in said vinyl group; —Q— is a divalent hydrocarbon having its valence bonds on different carbon atoms; the symbol M+ represents a cation selected from the group consisting of free acids, alkali metal salts, and ammonium, amine, sulfonium and quaternary ammonium salts, and 3. any remainder being one or more monoethylenically unsaturated comonomers; wherein there is present in the films and coatings produced from such latexes, prior to fusion thereof, from about 0.5 to about 5 percent by weight of polymer solids of adduct of an aliphatic alcohol or aliphatic acid and ethylene oxide, such adduct having the formula

where R is alkyl having from four to about 18 carbon atoms, Y is

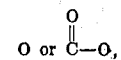

n is an integer of from 4 to 25 and Z is hydrogen.

It has been unexpectedly discovered, which discovery forms a part of the present invention, that the prescribed amounts and types of such adducts, when incorporated in the monomer charge or post-added to the polymer latex, exude to the surface of film or coatings prepared from the disclosed polymer latex as the film or coating fuses and crystallizes; and that such adduct remains present on such surfaces as heat and pressure are applied during conventional heat-seal operations. Under such applied heat and pressure, however, the solubility of the adduct, in the film or coating, appears to be increased sufficiently to reduce the temperature required for attaining an effective heat seal, i.e., excellent heat seals are obtained at temperatures as low as 120° C. as contrasted to temperatures of 160° C. or more for films or coatings absent such adduct. Although the exact mechanism is unknown, it is known that the comonomeric emulsifier constituent used in the preparation of the prescribed polymer latexes, although providing significantly enhanced latex colloidal stability, also results in higher heat-seal temperature requirements. It appears that the nonionic additives of this invention interact in some way with such comonomeric emulsifier to remove such detrimental characteristic.

DESCRIPTION OF THE PREFERRED EMBODIMENTS

The polymer latexes used in the present invention may be prepared in any conventional manner but are preferably prepared in aqueous dispersion by an essentially continuous, carefully controlled addition of the requisite polymerization constituents (including polymerization initiator systems if desired) to an aqueous medium, as per the techniques set forth in the U.S. Pat. No. 3,617,368, issued Nov. 2, 1971.

More particularly, it is often preferred to first add a small amount of the monomeric materials, as defined herein, to the aqueous medium having the desired pH value, followed by the subsequent addition of the necessary polymerization initiator, to form a polymeric seed latex in order to aid in the control of particle size. When forming such polymeric seed latexes by the procedure as described herein, small amounts of conventional wetting agents such as alkali soaps or the like, may be incorporated in the aqueous medium to further aid in the attainment of particles of desired size. The addition of such wetting agents, however, it not critical for the production of the highly stable aqueous colloidal dispersion of polymeric particles.

Following the formation of the polymeric seed latex, the remaining polymerization constituents are simultaneously and continuously added under carefully controlled conditions to the aqueous medium.

The compositions, as described herein, are subjected to conditions conducive to polymerization of the polymerizable constituents. In most instances, the temperature of the aqueous dispersion is adjusted, for example, to a temperature between about the freezing point of the serum and 100° C. to activate the polymerization. Other means, such as exposure of the composition to active radiation can be employed to promote polymerization of the polymerizable constituent.

As described, supra, the prescribed polymer latexes are prepared from a monomer composition containing at least about 80 percent by weight vinylidene chloride, and preferably between about 85 and 95 percent by weight of such monomer.

The copolymerizable ionic monomer of such polymer latexes are those monomeric materials which contain in this structure both an ionizable group and a reactive double bond, are significantly soluble in water, and where the substituent on the double bond is chemically stable under the conditions normally encountered in emulsion polymerization. Particularly useful are the sulfonic acids and their salts which may be described by the formula:

$$R-Z-Q-SO_3^- -M+$$

wherein the radical R is selected from the group consisting of vinyl and α-substituted vinyl; where the symbol Z represents a difunctional linking group which will activate the double bond present in the vinyl group, e.g., groups of the structure:

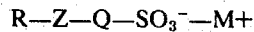

and the like; where —Q— is a divalent hydrocarbon having its valence bonds on different carbon atoms, e.g., the alkylene and arylene divalent hydrocarbon radicals having from one to about eight carbon atoms; and M+ is a cation.

The solubility of the defined copolymerizable ionic materials as described herein is strongly influenced by the cation M+. Exemplary of preferred cations are the free acids, alkali metal salts, ammonium and amine salts and sulfonium and quaternary ammonium salts.

It is further to be noted that with one of the ions above, and the ususal choices for R and Z, the solubility of the monomer depends on Q. As indicated, this group can be either aliphatic or aromatic and its size will determine the hydrophilic/hydrophobic balance in the molecule, i.e., if Q is relatively small the monomer is water soluble but as Q becomes progressively larger the surface activity of such monomer increases until it becomes a soap and ultimately a water-soluble wax. It is to be understood, however, that the limiting size of Q depends on R, Z and M+. As exemplary of the above, it has been found that sodium sulfoalkyl methacrylates of the formula:

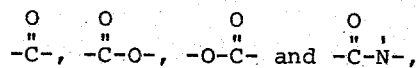

wherein $n$ is 2, are highly acceptable copolymerizable ionic materials for use in the present invention.

Further, the selection of R and Z is governed by the reactivity needed and the selection of Z is usually determined by the reaction used to attach the sulfonic acid to the base monomer (or vice versa).

It has been found that sodium sulfoethyl methacrylate is especially effective for use.

Other monomers which readily copolymerize with vinylidene chloride in aqueous dispersion, i.e., which copolymerize within a period of less than about 40 hours at a temperature ranging from the freezing point of monomeric serum up to about 100°C., and which preferably have a solubility in both the water and the oil phase of the polymer latex of at least 1 weight percent at the temperature of polymerization, may also be used in preparation of the polymer latexes used in the present invention. Exemplary of preferred materials are methacrylic acid, methyl methacrylate, hydroxy ethyl and propyl acrylates, hydroxyethylmethacrylate, acrylic acid, acrylonitrile, methacrylonitrile, acrylamide and the lower alkyl and dialkylacrylamides, acrolein, methylvinyl ketone and vinyl acetate.

The adduct of an aliphatic alcohol or aliphatic acid and ethylene oxide prescribed by the present invention may be added with the monomer charge during preparation of the polymeric latex or may be post-added following preparation of the latex, or may be coated on the surface of films or coatings prepared from such latexes, prior to fusion thereof.

Exemplary of specific adduct materials which are useful in the present invention are the condensates prepared from aliphatic alcohols such as n-butyl alcohol, $n$-pentyl alcohol, n-hexyl alcohol, n-octyl alcohol, n-decyl alcohol, n-dodecyl alcohol, n-tetradecyl alcohol, n-hexyldecyl alcohol and n-octadecyl alcohol with from 4 to about 25 moles of ethylene oxides; and the condensates of the corresponding aliphatic acids containing from about four to 18 carbon atoms including butyric acid, valeric acid, caproic acid, caprylic acid, capric acid, lauric acid, myristic acid, palmitic acid and stearic acid, with from about 4 to 25 moles of ethylene oxide.

The latexes of the present invention are particularly useful for preparing coated products comprising a wide variety of substrates having a continuous, adherent, dried coating of such latex thereon which coating has excellent barrier, flexibility, low heat-seal temperature requirement and excellent binding capacity properties.

Exemplary of the substrates which may be advantageously coated with the polymer latexes of this invention are sheets or films of: the nonaromatic hydrocarbon olefin polymers such as the polymers and interpolymers of ethylene, propylene, and butylene and the like and their halogenated derivatives; the aromatic hydrocarbon polymers such as the polymers and interpolymers of styrene and the like; the polyesters such as polyethylene terephthalate and the like; various polyamides such as polyhexamethylene adipamide among others; polyimides; the halogenated ethylene polymers such as the vinyl and vinylidene chloride homopolymers and interpolymers; polyacrylonitrile; regenerated cellulose; and the various cellulose esters such as cellulose acetate, cellulose nitrate and cellulose acetate butyrate; polyvinyl acetals; vinyl combinations such as polyvinyl chloride/polyvinyl acetate copolymers; fibrous cellulosic materials such as tissue paper, book papers, crepe paper, wrapping paper, cardboard, chipboard, wallboard and the like; metals such as aluminum and tin, among others; wood products such as plywood; textiles such as cotton textiles and fabrics; other vegetable fiber products; and other substrata which are relatively insoluble in the coating dispersions of the present invention. It is to be understood that the polymer latexes described herein can also be used to cast unsupported films or sheets if desired.

The following examples illustrate the polymer latexes and preparation of coated products therefrom according to this invention, but are not to be construed as limiting its scope. In the examples, parts and percentages are by weight unless otherwise indicated.

EXAMPLE 1

Into a polymerization vessel was charged a mixture of 500 grams of deionized water (adjusted to pH of 3.5 with glacial acetic acid) and 2.5 grams of sodium dodecyl benzene sulfonate. To this mixture was subsequently added an initial monomer charge comprising 46 grams of vinylidene chloride, 4 grams of acrylonitrile and 0.05 grams t-butyl hydroperoxide.

The reaction mixture was then stirred under nitrogen for a period of 20 minutes at a temperature of 30° C., and a solution comprising 2.7 grams of sodium formaldehyde sulfoxylate in 500 grams aqueous solution was thereafter added to the reaction mixture at a rate of 7.7 grams of solution per hour until polymerization of the initial charge of monomers was completed. Following completion of polymerization of the initial charge of monomeric materials, a second monomeric mixture comprising 1,012 grams of vinylidene chloride, 88 grams of acrylonitrile and 1.1 grams of t-butyl hydroperoxide was added to the polymerization vessel with stirring at a rate of 55 grams of the mixture per hour for a period of 20 hours. Over the same period of time, a solution comprising 17.6 grams of sodium sulfoethyl methacrylate in 300 grams of aqueous solution was separately added to the polymerization vessel at a rate of 15 grams of solution per hour. Following the addition of the polymerizable materials, the herein described aqueous solution of sodium formaldehyde sulfoxylate was added to the polymerization vessel at the pre-established rate for a period of 2 hours, to allow completion of polymerization of the monomeric constituents. The resulting polymerization product was a highly colloidally stable, low-foaming, aqueous colloidal polymer dispersion containing approximately 50 to 52 percent polymer solids prepared from a total monomer charge of about 92 parts by weight of vinylidene chloride, about 8 parts by weight of acrylonitrile and about 1.6 parts by weight of sodium sulfoethyl methacrylate.

Thereafter, in each of a series of experiments, one of several emulsifiers were admixed, at varying concentrations, to individual portions of the polymer latex and each admixture allowed to stand overnight. The admixtures were then each coated on separate portions of a substrate composed of glassine paper having thereon a topcoat of a soft vinylidene chloride polymer. Each coated sample was then aged at 140° F. for a period of about 16 hours to permit crystallization of the applied vinylidene chloride latex. After aging, the heat-seal values for each coated sample were determined, as grams per inch width, after each coated sample had individually been subjected to a pressure of 20 psi for a period of 1 second under normal room temperatures.

The emulsifiers used have the following designations and structures:

| Emulsifier Designation | Structure |
|---|---|
| A | Sodium salt of dodecylbenzene sulfonate |
| B | Sodium lauryl sulfate |
| C | Sodium salt of disulfonated alkyl biphenyl oxide |
| D | Adduct of lauryl alcohol with 4 moles of ethylene oxide |
| E | Adduct of lauryl alcohol with 12 moles of ethylene oxide |
| F | Adduct of lauryl alcohol with 25 moles of ethylene oxide |

The following Table I sets forth the types and amounts of emulsifiers used and the heat-seal values obtained:

TABLE I

| Exp. No. | Emulsifier Type | Amount (% by weight of polymer solids) | Heat Seal (Gms./in. width) 110°C. | 120°C. | 130°C. |
|---|---|---|---|---|---|
| For comparison | | | | | |
| 1 | None | | 0 | 0 | 0 |
| 2 | A | 0.5 | 5 | 6 | 18 |
| 3 | A | 1.0 | 5 | 8 | 16 |
| 4 | B | 0.5 | 4 | 5 | 8 |
| 5 | B | 1.0 | | | |
| 6 | C | 0.5 | 2 | 6 | 24 |
| 7 | C | 1.0 | 2 | 6 | 16 |
| The Invention | | | | | |
| 8 | D | 0.5 | 16 | 45 | 85 |
| 9 | D | 1.0 | 65 | 161 | Substrate tear[1] |
| 10 | E | 0.5 | 13 | 54 | 131 |
| 11 | E | 1.0 | 72 | Substrate tear | |
| 12 | F | 0.5 | 16 | 102 | Substrate tear |
| 13 | F | 1.0 | 30 | 94 | Substrate tear |

[1]Seal strength exceeds strength of the substrate.

The data from Table I illustrate the significantly enhanced low temperature heat-seal characteristics obtained using the emulsifiers prescribed by the present invention. In addition, such reduction in heat-seal temperature requirements was not accompanied by any observable loss in impermeability or other desirable properties of the latex coating.

EXAMPLE 2

Series A

In each of a series of experiments, a polymer latex was prepared essentially as described in Example 1 herein but with and without the presence of the ionic, copolymerizable salt of sulfonic acid (sodium sulfoethyl methacrylate), and with and without an adduct of an aliphatic alcohol or aliphatic acid and ethylene oxide as an emulsifier. In those instances where such an emulsifier was present the material was an adduct of lauryl alcohol with 12 moles of ethylene oxide which was used in an amount of from 3 to 5 percent by weight of polymer solids. The resulting polymeric latexes, containing 40 percent by weight of polymer solids, was applied to 30 pound, white, opaque glassine in two coats. A No. 5 Mayer rod was used for the first coat and then a No. 8 Mayer rod for the second coat giving a total coating weight in the range of 5 to 7 pounds per 3,000 ft.² Each coat was dried for 10 to 20 seconds in a forced air oven operating at a temperature of about 250° to 300° F. The minimum heat-seal temperature (MHST) was determined by separately sealing 1-inch wide strips of coated material at varying temperatures using a 10 to 20 PSI heat sealer jaw pressure and ½ to 1 second dwell time. The MHST was determined as that temperature required to cause complete fiber tear of the seal as it was pulled apart on a Scott × 5 tensile tester.

The following Table II sets forth the presence or absence of the sulfonic acid salt and the prescribed adduct, as well as the minimum heat-seal temperature (MHST) of each coated sample.

TABLE II

| Sample No. | Sulfonic Acid Salt (% by wt.) | Emulsifier (% by wt.) | MHST (°C) |
|---|---|---|---|
| For Comparison | | | |
| 14 | none | none | 135-140 |
| 15 | none | 3 | 135 |
| 16 | 1.4 | none | 140 |
| The Invention | | | |
| 17 | 1.4 | 5 | 80-85 |
| 18 | 1.4 | 3 | 100-100 |

Series B

The experiments as described in Series A above were repeated utilizing a polymer latex, the polymer solids of which were prepared from a monomer composition of about 80 parts by weight vinylidene chloride, about 15 parts by weight butyl acrylate, about 5 parts by weight acrylonitrile and about 1.6 parts by weight of sodium sulfoethyl methacrylate. The following Table III sets forth the presence or absence of the sulfonic acid salt and the alkyl phenol olefin oxide adduct, as well as the minimum heat-seal temperature (MHST) of each coated sample.

TABLE III

| Sample No. | Sulfonic Acid Salt (% by wt.) | Emulsifier (% by wt.) | MHST (°C.) |
|---|---|---|---|
| For Comparison | | | |
| 19 | 1.6 | none | 110-115 |
| The Invention | | | |
| 20 | 1.6 | 5 | 75-85 |
| 21 | 1.6 | 3 | 80-85 |

What is claimed is:

1. A process for reducing the heat-seal temperature requirements of films and coatings produced from a polymer latex which latex consists essentially of water and a colloidally dispersed solid polymer prepared by the polymerization in aqueous dispersion of 1. at least about 80 percent by weight based on the total weight of monomers used of vinylidene chloride, and
2. from about 0.1 to about 5 percent based on the total weight of the monomers used of a significantly water-soluble ionic material selected from the group of sulfonic acids and their salts having the formula $$R-Z-Q-SO_3^- -M^+$$

wherein the radical R is selected from the group consisting of vinyl and alpha-substituted vinyl; the symbol Z represents a difunctional linking group of the structure

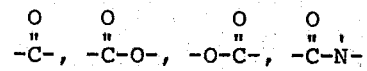

which will activate the double bond present in said vinyl group; —Q— is an alkylene and arylene divalent hydrocarbon having from one to about eight carbon atoms and having its valence bonds on different carbon atoms; the symbol M+ represents a cation selected from the group consisting of free acids, alkali metal salts, and ammonium, amine, sulfonium and quaternary ammonium salts, and 3. any remainder being one or more monoethylenically unsaturated comonomers selected from the group consisting of methacrylic acid, methyl methacrylate, hydroxyethylacrylate, hydroxypropylacrylate, hydroxyethylmethacrylate, acrylic acid, acrylonitrile, methacrylonitrile, acrylamide and the lower alkyl and dialkylacrylamides, acrolein, methylvinyl ketone and vinyl acetate, said process comprising: having present in said polymer latex prior to fusion of said latex into a film or coating from about 0.5 to about 5 percent by weight of latex polymer solids of an adduct of an aliphatic alcohol or aliphatic acid and ethylene oxide, such adduct having the formula $$R-Y+(CH_2CH_2-O+)_n Z$$

where R is alkyl having from four to about 18 carbon atoms, Y is

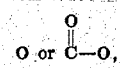

n is an integer of from 4 to 25 and Z is hydrogen.

2. The process of claim 1 wherein said significantly water-soluble ionic material is sodium sulfoethyl methacrylate.

3. The process of claim 2 wherein said adduct is an adduct of lauryl alcohol with from 4 to 25 moles of ethylene oxide.

4. The process of claim 2 wherein said polymer latex is prepared from a monomer composition of about 92 parts by weight vinylidene chloride, about 8 parts by weight acrylonitrile and from about 1.4 to 1.6 parts by weight sodium sulfoethyl methacrylate.

5. The process of claim 2 wherein said polymer latex is prepared from a monomer composition of about 80 parts by weight vinylidene chloride, about 15 parts by weight butyl acrylate, about 5 parts by weight acrylonitrile and about 1.6 parts by weight of sodium sulfoethyl methacrylate.

* * * * *